(12) United States Patent
Shirani-Mehr et al.

(10) Patent No.: US 11,151,882 B2
(45) Date of Patent: Oct. 19, 2021

(54) PROVIDING A MODEL OF A VEHICLE TO A RIDER AT AN ACCURATE ORIENTATION

(71) Applicant: Uber Technologies, Inc., San Francisco, CA (US)

(72) Inventors: Houtan Shirani-Mehr, Santa Clara, CA (US); Aaron Matthew Rogan, Westminster, CO (US); Kapil Gupta, Sunnyvale, CA (US); Wei Hao, Boulder, CO (US)

(73) Assignee: Uber Technologies, Inc., San Francisco, CA (US)

( * ) Notice: Subject to any disclaimer, the term of this patent is extended or adjusted under 35 U.S.C. 154(b) by 85 days.

(21) Appl. No.: 16/718,031

(22) Filed: Dec. 17, 2019

(65) Prior Publication Data

US 2020/0342764 A1 Oct. 29, 2020

Related U.S. Application Data

(60) Provisional application No. 62/839,512, filed on Apr. 26, 2019.

(51) Int. Cl.
*G08G 1/00* (2006.01)
*G06K 9/00* (2006.01)
*G01C 21/36* (2006.01)

(52) U.S. Cl.
CPC ......... *G08G 1/202* (2013.01); *G01C 21/3635* (2013.01); *G01C 21/3647* (2013.01); *G06K 9/00288* (2013.01)

(58) Field of Classification Search
CPC ............ G01C 21/3438; G01C 21/3635; G01C 21/3647; G06K 9/00201; G06K 9/00288; G06K 9/00671; G06K 9/6228; G08G 1/202
See application file for complete search history.

(56) References Cited

U.S. PATENT DOCUMENTS

2019/0043365 A1* 2/2019 McDavitt-Van Fleet .................... G08G 1/202

\* cited by examiner

*Primary Examiner* — Omeed Alizada
(74) *Attorney, Agent, or Firm* — Fenwick & West LLP (57) ABSTRACT

Systems and methods are disclosed herein for providing a model of a vehicle to a rider. In an embodiment, the systems and methods determine that a driver has accepted a task to operate a vehicle from a first location to a rider location. The systems and methods then access a model corresponding to the vehicle, determine a direction of movement of the vehicle, and determine a relative orientation of the vehicle with respect to the rider based on the first location, the direction of movement of the vehicle, and the rider location. The systems and methods generate for display, on a client device of the rider, the model at an angle determined based on the relative orientation.

20 Claims, 6 Drawing Sheets

PROVIDING A MODEL OF A VEHICLE TO A RIDER AT AN ACCURATE ORIENTATION

CROSS REFERENCE TO RELATED APPLICATIONS

This application claims the benefit of U.S. Provisional Application No. 62/839,512, filed Apr. 26, 2019, which is hereby incorporated in its entirety by reference.

TECHNICAL FIELD

The present disclosure relates to display of a model, and in particular to orienting the model to an angle consistent with a positioning of the real-world object being modeled relative to a user.

BACKGROUND

Existing tools for assisting a rider to identify a vehicle in which they are to enter to travel to a requested destination are limited to showing the name of a make, model, and color of the vehicle, a license plate number of the vehicle, and a generic picture of the vehicle. From a practical standpoint, these existing tools are inadequate to validate to a rider that the rider is entering a correct vehicle, as some vehicles are so commonplace, or generic looking, that there may be two or more similar or identical models adjacent to one another, and a rider may make a mistake as to which one is the correct vehicle. Moreover, the generic picture is typically from a side angle; however, vehicles often approach riders with only the front of the vehicle visible to the rider, thus rendering the side angle of the generic picture unusable to validate that a correct vehicle has approached the rider. From a technical standpoint, the existing systems rely on generic pictures at least partially because the storage space to store unique photographs from multiple angles of every driver's vehicle would be prohibitive, as would the bandwidth requirements to separately transmit these unique photographs to riders each time the rider is connected with a given vehicle.

SUMMARY

Systems and methods are disclosed herein for generating, and providing to a user, a model of a vehicle that accurately represents the vehicle. For example, a model (e.g., a 3D model) may be initially constructed from a generic model associated with a make, model, and color of a vehicle. A driver of the vehicle may be prompted to capture images of the vehicle from multiple angles. A service may extract distinguishing features of the vehicle from the photographs (e.g., bumper stickers, dents, etc.), and may store those distinguishing features. When a rider connects with a driver and wishes to view an image of the vehicle, the service may output the model, and may overlay the model with the distinguishing features. Moreover, the model may be provided to the rider at an angle that matches the rider's view of the car (e.g., a front of the car may be shown to the rider if the vehicle is approaching the rider head-on), to ease the rider's ability to verify that the correct vehicle is approaching.

To this end and others, in an embodiment, a service may determine that a driver has accepted a task to operate a vehicle from a first location to a rider location. The service may access a model corresponding to the vehicle (e.g., a generic 3D model corresponding to the make, model, and color of the vehicle). The service may determine a direction of movement of the vehicle, and may determine the relative orientation of the vehicle with respect to the rider based on the first location, the direction of movement of the vehicle, and the rider location (e.g., to determine what angle of the 3D model to display to the user (and additionally, a scale to which the 3D model should be displayed). The service may output (e.g., on a display of a client device of the rider), the model at an angle determined based on the relative orientation. The displayed model may be shown to the user at the same angle that the rider is oriented with respect to the vehicle.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
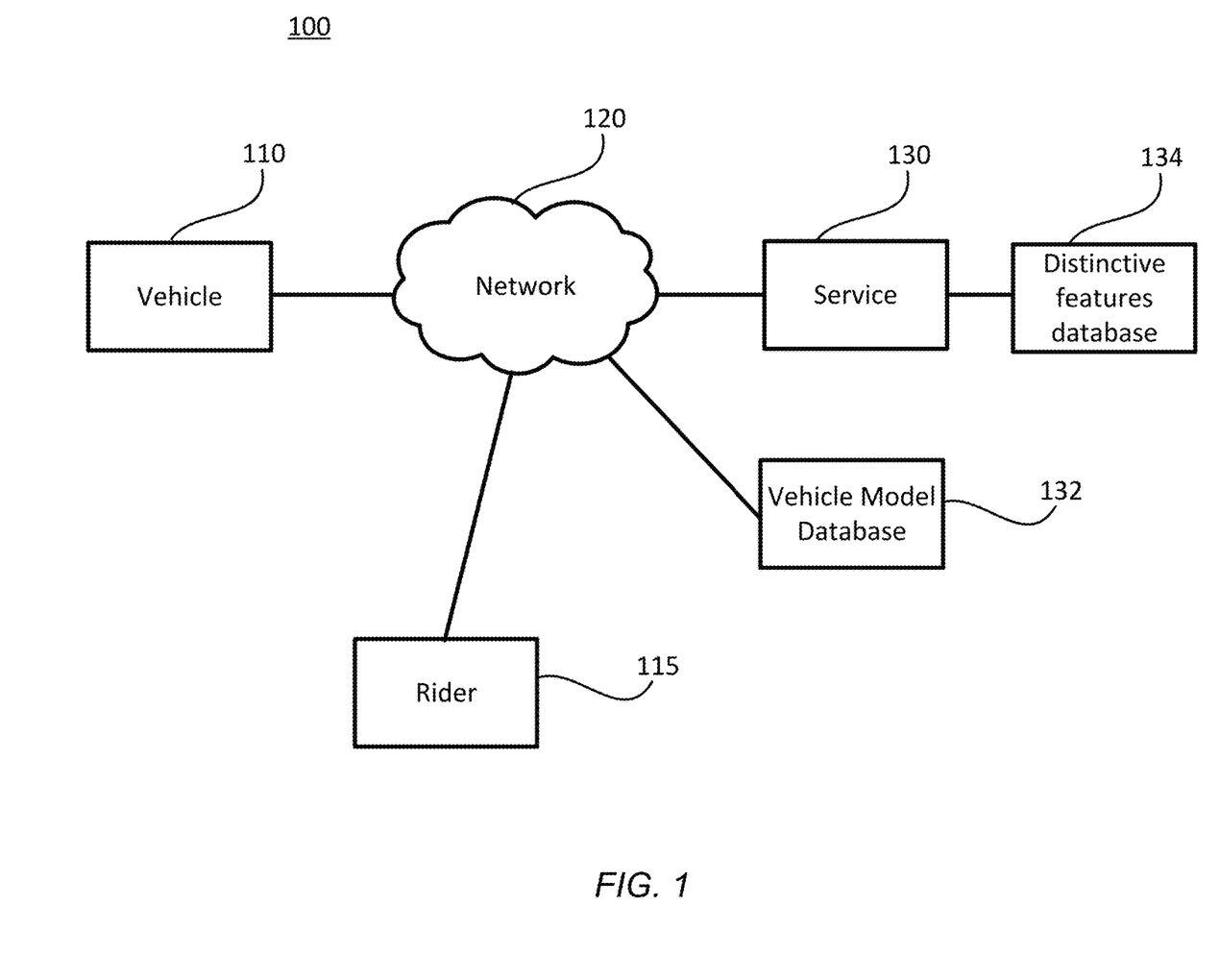
FIG. 1 is a block diagram illustrating a model generation service, according to one embodiment.

FIG. 1 is a block diagram illustrating a model generation service, according to one embodiment. System 100 includes vehicle 110, which may be carrying a client device. The client device may include a camera sensor and/or a display that may accept user input. The client device may be a mobile device (e.g., a smartphone of an operator of the vehicle), or a peripheral device (e.g., a beacon affixed to vehicle 110, a dashcam, etc.). The functionality of client devices is described in further detail with respect to FIG. 6 below.

The operator (interchangeably used herein with the term "driver") of vehicle 110 may operate a client device that executes an application, such as a ridesharing application. In the context of the ridesharing application, a rider (e.g., rider 115) may request a ride from the rider 115's current location to a desired destination, and where rider 115 may be connected to the driver of vehicle 110 who also uses the ridesharing application on his or her client device, where the driver will provide the ride. The driver of vehicle 110 may be connected to rider 115 based on the driver accepting a request from rider 115 by way of a user interface offered to the driver by way of the client device of the driver.

Requests from rider 115, acceptances from the driver of vehicle 110, and other data transmissions may be transmitted over network 120. Network 120 is described in further detail below. Service 130 may act as an intermediary between rider 115 and the driver of vehicle 110, receiving and processing requests and confirmations from various riders and drivers to confirm that operators of vehicles are assigned to a particular task, and to confirm to riders that their requested task is accepted and assigned. Service 130, in addition to acting as a back end for a ridesharing application, may provide additional information to an operator of vehicle 110 and/or to rider 115. In particular, as will be described below with respect to FIGS. 2-5, service 130 may provide a model of vehicle 110 to rider 115, and/or to the operator of vehicle 110.

As used herein, the term model may refer to a two-dimensional or three-dimensional representation of a vehicle, such as vehicle 110. The model may include distinctive features of a vehicle, such as bumper stickers, dents, scratches, lighting, and the like, that differentiate the vehicle from other vehicles of the same make and type by the manufacturer of the vehicle. In some embodiments, in connection with generating the model, service 130 may prompt an operator of vehicle 110, in the context of the ridesharing application, to take one or more photographs and/or videos of vehicle 110 from one or more perspectives. For example, service 130 may prompt the operator to capture photos or video while walking around the entire perimeter of vehicle 110. Service 130 may receive the photos and/or video(s) from the client device of the operator by way of network 120.

Service 130 may process the photos and/or videos to detect and extract distinctive features of vehicle 110 from the photos and/or videos. For example, service 130 may prompt the operator of vehicle 110 to identify the make and type of the vehicle (e.g., indicate brand manufacturer, model number, vehicle identification number, color, year, etc.). Service 130 may, based on the input of the operator, retrieve, from vehicle model database 132, a model of a generic version of the identified type of vehicle ("generic model"). The generic model may be a three-dimensional model, or one or more images that illustrate one or more perspectives of the vehicle. The generic model, or portions thereof (e.g., still two-dimensional frames of a rotatable three-dimensional model), may be used as a template for comparison against the photos received from the operator of vehicle 110, where service 130 detects distinctive features based on portions of the photos that depart from the generic model. For example, service 130 may detect that a bumper sticker, scratch, dent, or animated seat cover departs from the generic model because it does not match the template. Service 130 may responsively extract the distinctive feature(s), and store the distinctive features in distinctive features database 134.

When extracting the distinctive features, service 130 may extract both an image of the distinctive feature and coordinates of where the distinctive feature sits on vehicle 110 relative to a landmark (e.g., relative to a window, bumper, door handle, etc.) of the generic model. Thus, service 130 may save storage space of distinctive features database 134, as well as latency, bandwidth, and processing power for reconstructing an image of a perspective of vehicle 110, by only needing to retrieve a vector with the distinctive feature itself and where it sits on the generic model. Service 130 may thus provide the model by reconstructing the model of vehicle 110 using the coordinates, the image, and the generic model retrieved from vehicle model database 132. Alternatively, service 130 may save an entire perspective of the vehicle (e.g., a right side view of vehicle 110) and stitch that entire perspective to a generic model retrieved from vehicle model database 132 to provide the model.

Vehicle Model Description

Figure 2A:
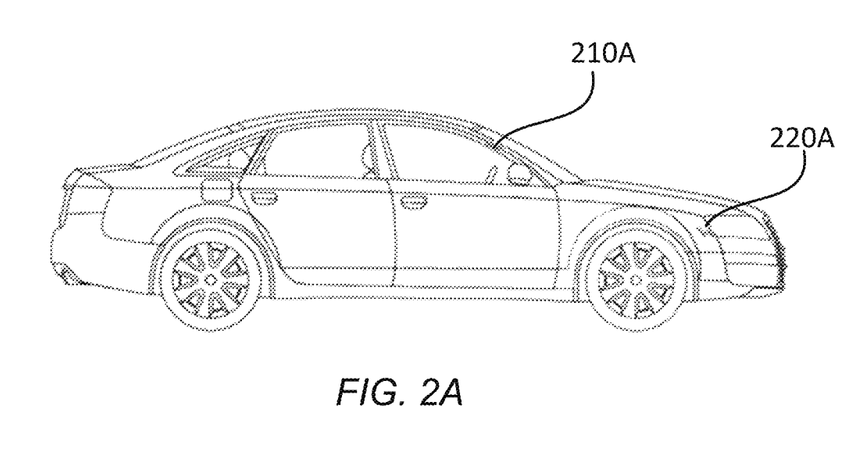
FIGS. 2A-2D show an illustration of an exemplary model from various perspectives, according to one embodiment.
Figure 2B:
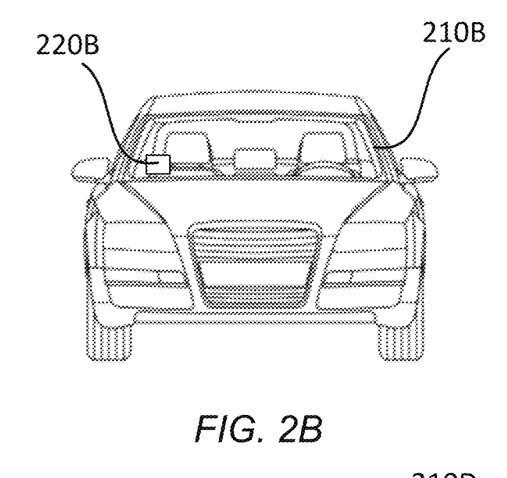
Figure 2C:
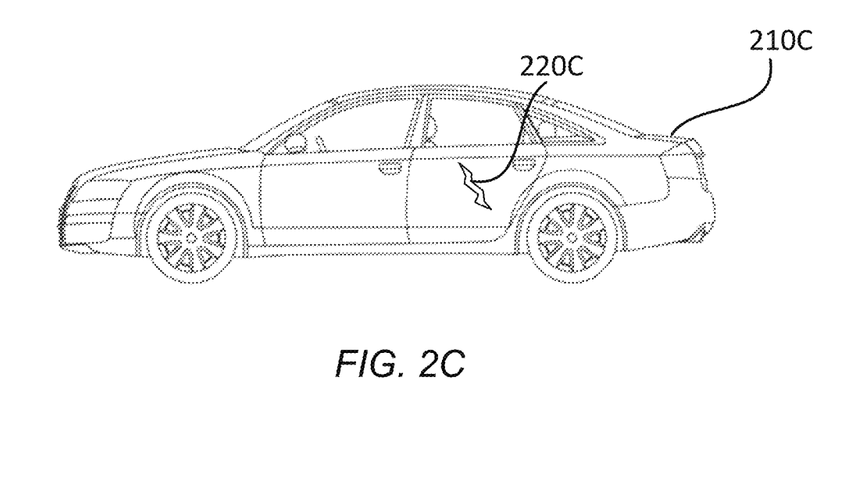
Figure 2D:
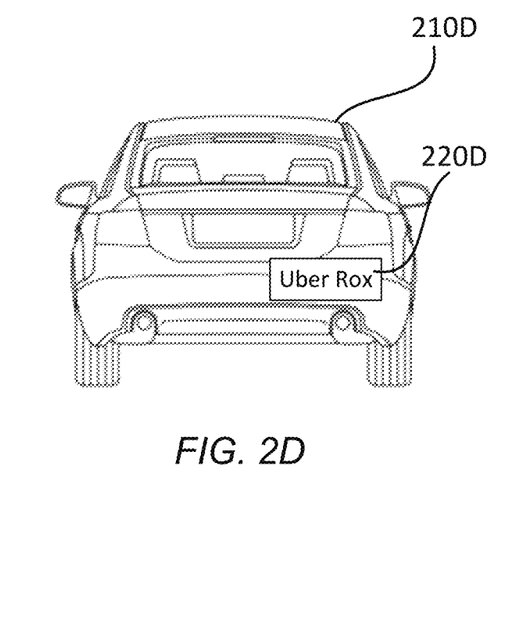

FIGS. 2A-2D show an illustration of an exemplary model from various perspectives, according to one embodiment. FIG. 2A-2D depict vehicle 210 at varying angles, with examples of distinctive features. Vehicles 210A-210D carry the same weight and description of vehicle 110. As shown in FIG. 2A, vehicle 210A is depicted from a side view, where dent 220A appears on the side of vehicle 210A. As shown in FIG. 2B, vehicle 220B is depicted from a front view, where sticker 220B appears on the dashboard of vehicle 210B. As shown in FIG. 2C, vehicle 210C is depicted from an opposite side view, where custom paint 220C appears on the side of vehicle 210C. As shown in FIG. 2D, vehicle 210D is depicted from a rear view, where bumper sticker 220D appears on the rear bumper of vehicle 210D. In some embodiments, the model may be shown to rider 115 or the operator of vehicle 110 using two-dimensional views corresponding to FIGS. 2A-2D, where a user may toggle through the views (e.g., by interacting with "left", "right", "front", and "back" selectable options). In some embodiments, the model may be a three-dimensional model that may be shown to rider 115 or the operator of vehicle 110 using the views corresponding to FIGS. 2A-2D with three-dimensional depth. Additionally or alternatively, the model may be rotatable by a user, so that vehicle 210 can be viewed from any angle by rotating the model (e.g., by making a left-to-right swipe gesture, or vice-versa, over the model).

Exemplary Selection of Initial Model Orientation

Figure 3:
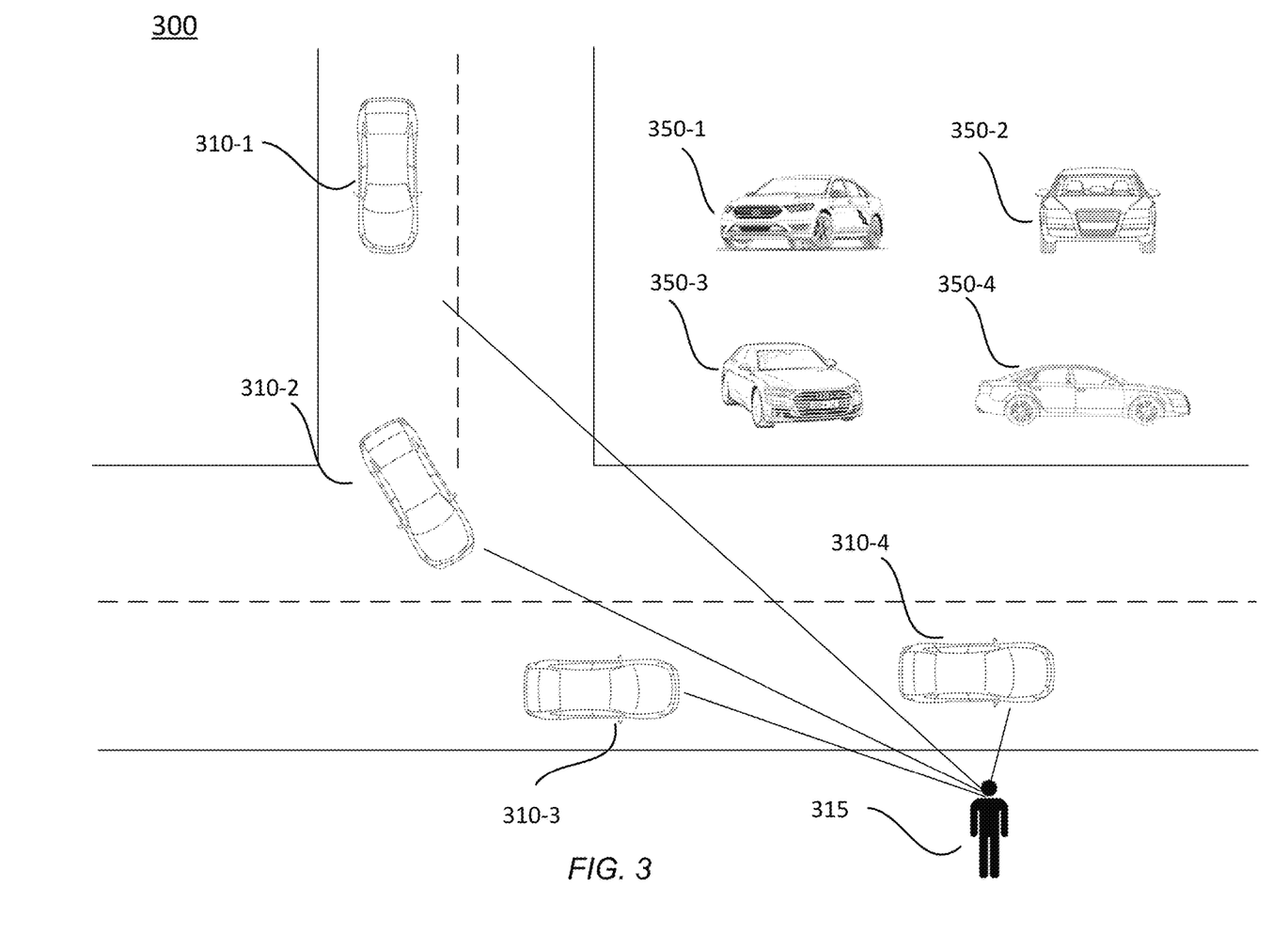
FIG. 3 is an illustration of an exemplary manner for selecting a perspective of the model to output, according to one embodiment.

FIG. 3 is an illustration of an exemplary manner for selecting a perspective of the model to output, according to one embodiment. Environment 300 includes vehicle 310 and rider 315, which correspond to vehicle 110 and rider 115, respectively. As depicted, a driver of vehicle 310 may have accepted a task to pick up rider 315 at a particular location (e.g., the location where rider 315 is depicted). As part of the task, vehicle 310 may progress past several positions, including positions 310-1, 310-2, 310-3, and 310-4. User interface 350 depicts an exemplary model that would be generated for display and output to rider 315, where the model would be oriented differently based on what position vehicle 310 had reached when rider 315 accessed user interface 350. User interface 350-1 corresponds to vehicle 310 at position 310-1; user interface 350-2 corresponds to vehicle 310 at position 310-2; user interface 350-3 corresponds to vehicle 310 at position 310-3; user interface 350-4 corresponds to vehicle 310 at position 310-4.

Relative to rider 315, at position 310-1, vehicle 310 is angled slightly off from a front profile view, as rider 315 would, assuming a clear line of sight to vehicle 310, be able to see some of the left side of vehicle 310, as well as the front profile of vehicle 310. Thus, in response to detecting that rider 315 has accessed the model, service 130 may generate for display user interface 350-1, showing a corresponding angle of the vehicle. Similarly, at position 310-2, vehicle 310 is facing rider 315 head-on, and thus, in response to detecting that rider 315 has accessed the model, service 130 may generate for display user interface 350-2. This process continues similarly when rider 3135 accesses user interface 350 when the vehicle is at position 310-3 or 310-4.

In some embodiments, the model remains static when the rider accesses user interface 350, where the initial orientation of the model is selected based on the position of vehicle 310 at the time the user accessed user interface 350. In such embodiments, the user may, using a gesture, voice command, text command, or the like, command the application to rotate the orientation of the model to a position the user prefers. In some embodiments, the application may rotate the orientation of the model as vehicle 310 progresses from position-to-position (or as rider 315 moves to a different location), thus maintaining the model at its current orientation relative to rider 315. The application may output options to the user to employ standard image manipulation techniques, such as pan operations, zoom operations, and the like, thus allowing the user to, e.g., zoom the view of the model in or out.

Exemplary Driver-Facing Model Interface

Figure 4:
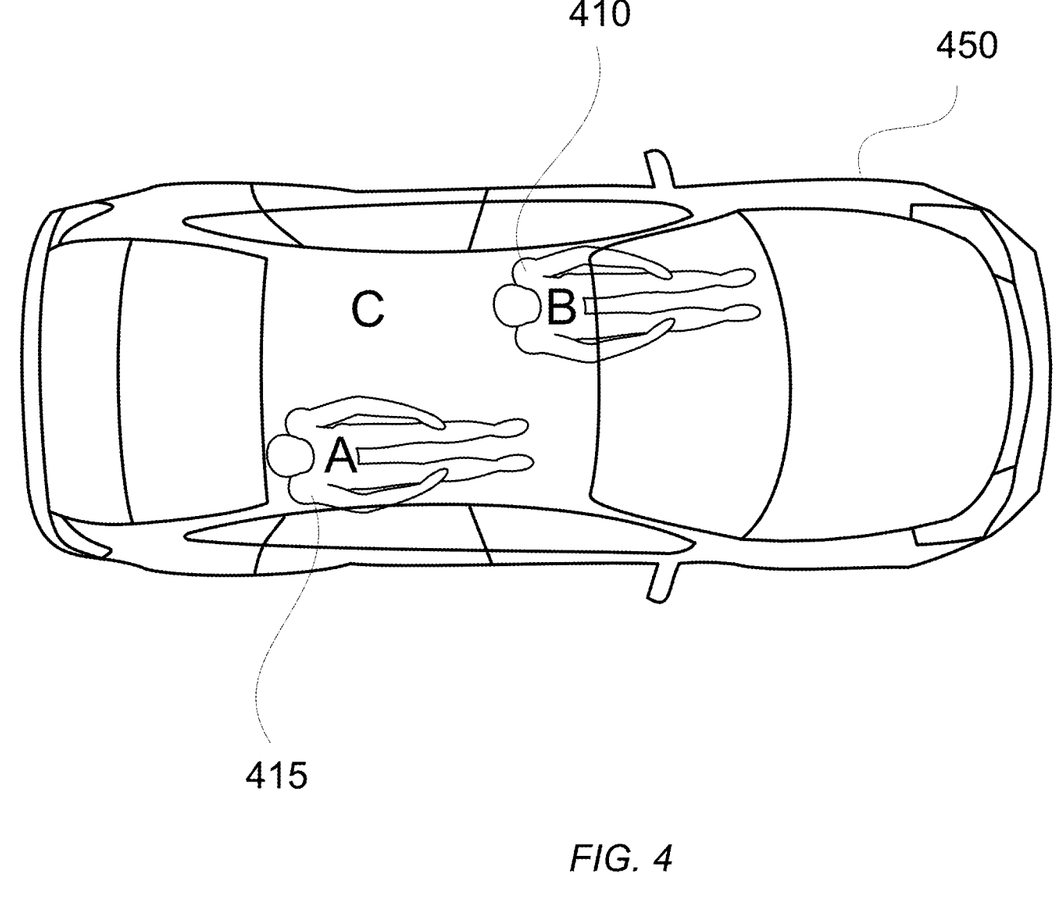
FIG. 4 is an illustration of an exemplary user interface for an operator of a vehicle, according to one embodiment.

FIG. 4 is an illustration of an exemplary user interface for an operator of a vehicle, according to one embodiment. Model 450 includes the same functionality as described with respect to the model as described above with respect to FIGS. 1-3. Model 450 depicts where humans are seated at various positions. For example, driver 410, who is operating vehicle 110, may be seated at position B. Rider 415 may be seated at position A. In an embodiment, model 450 is updated to reflect that rider 415 is seated at position A in response to receiving input from driver 410 (e.g., a tap at position A) that indicates that rider 415 is seated at position A. In an embodiment, service 130 detects that rider 415 is seated at position A based on near-field communication, a weight sensor, or other sensory means. Service 130 updates model 450 to reflect where rider 415, and other riders, are seated in order to help indicate to potential further riders who are to enter vehicle 110 where those riders should enter (e.g., a door adjacent to a vacant seat).

In a scenario where vehicle 110 is to pick up multiple riders, service 130 may output model 450 to driver 410 (e.g., when vehicle 110 is not in motion) to indicate where riders are seated, or where they are to be seated. Based on a configuration of model 450, service 130 may output model 450 to additional riders so that the additional riders may select a vacant seat and enter the vehicle where the seat is vacant. Additionally or alternatively, service 130 may select a seat for each next additional rider to be picked up, and may highlight or otherwise accentuate that position when outputting model 450 to the additional rider. Alternatively or additionally, service 130 may transmit instructions (e.g., textual or verbal instructions) instructing the additional rider where to sit (e.g., instructions stating "please enter using the driver-side passenger door to take your seat.").

Process for Generating and Outputting Model

Figure 5:
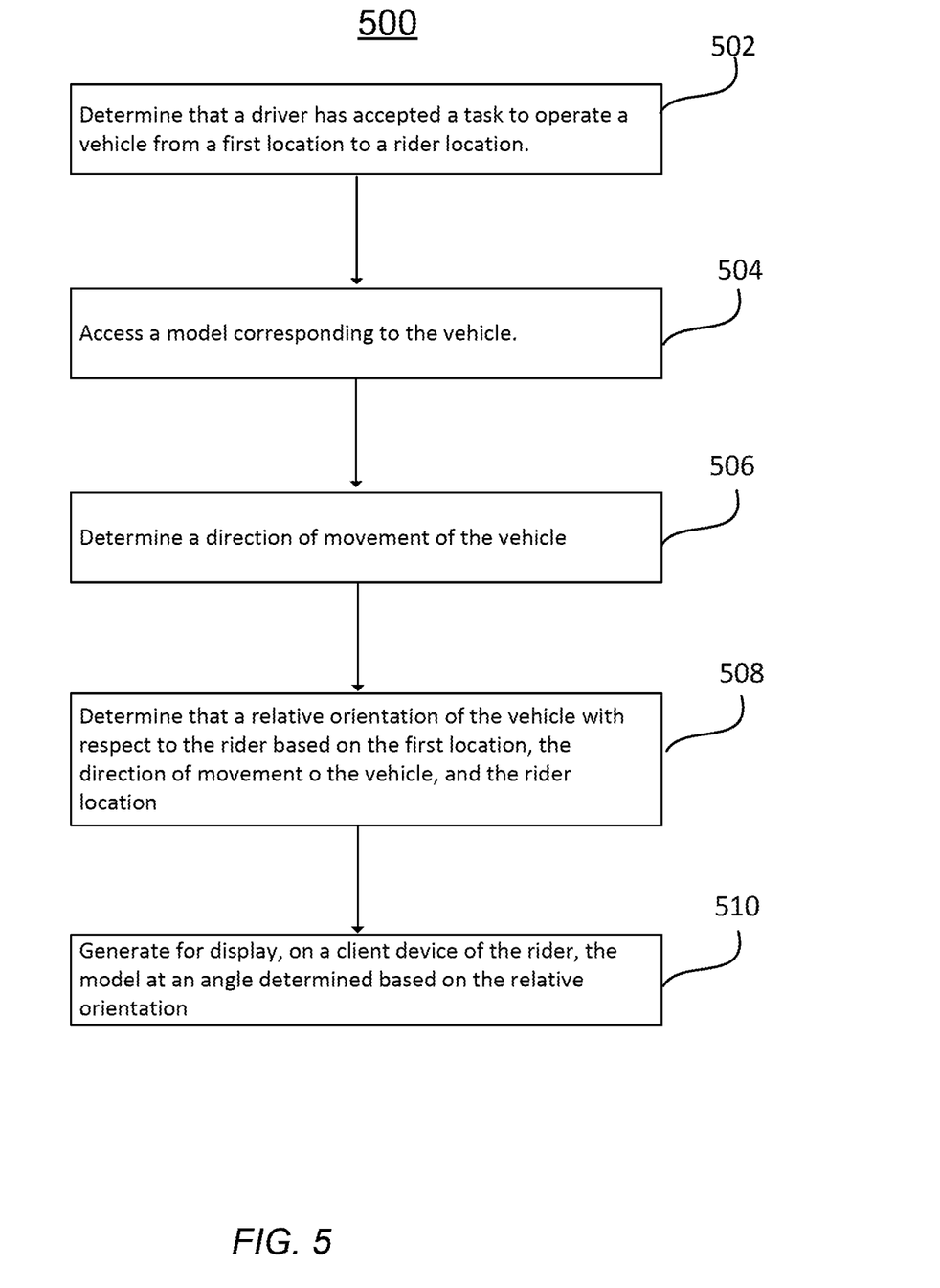
FIG. 5 is an illustrative flowchart of a process for outputting the model for display, according to one embodiment.

FIG. 5 is an illustrative flowchart of a process for outputting the model for display, according to one embodiment. Process 500 may be executed, or instructed to be executed, by an application (e.g., a ridesharing application residing on a client device of a rider and/or a driver), or by service 130. Process 500 will, for convenience, be described with respect to service 130 below. Process 500 begins with service 130 determining 500 that a driver (e.g., of vehicle 110) has accepted a task to operate a vehicle from a first location (e.g., location 310-1) to a rider location (e.g., the location of rider 315). Service 130 then accesses 504 a model corresponding to the vehicle. For example, service 130 may retrieve a model from vehicle model database 132. The model, as discussed above, may be a generic model, from which a more accurate model is generated 510 (e.g., by retrieving distinctive features of vehicle 110 from entries of distinctive features database 134, and applying those distinctive features to the generic model). Alternatively, the model, as discussed above, may be an accurate model including the distinctive features, as retrieved from vehicle model database 132.

Service 130 goes on to determine 506 a direction of movement of the vehicle. The direction of movement may be measured absolutely (e.g., in terms of north/south/east/west, based on feedback from a compass or global positioning system sensor of vehicle 110 or a client device of an operator of vehicle 110) or relatively (e.g., with respect to rider 115). For example, as depicted in FIG. 3, as vehicle 310 travels from position 310-1 to position 310-2, the direction of movement may be measured as "south," or may alternatively be measured in terms of relative location with respect to rider 315.

Service 130 then determines 508 a relative orientation of the vehicle (e.g., vehicle 310) with respect to the rider (e.g., rider 315) based on the first location (e.g., location 310-1), the direction of movement of the vehicle, and the rider location (e.g., the location of rider 315). For example, if vehicle 310-1 is determined by service 130 to be traveling due south from a particular location that is north and west of the rider (as depicted in FIG. 3 as vehicle 310 travels from location 310-1 to location 310-2), service 130 may determine that the orientation of the vehicle, with respect to rider 315, is mostly front-facing, with some of the left side of the car visible to the rider. In an embodiment, service 130 may determine the heading of the vehicle based on, e.g., sensor readings such as a compass sensor, input from the driver, and/or a tracking of position from a last known location to a current location, and a calculation of heading from the tracked position movement.

In an embodiment, to determine the relative orientation of the vehicle, service 130 may determine, based on the location of the rider and the first location, a line of sight between the rider and the vehicle (e.g., the line of sight illustrated between rider 315 and each of locations 310-1, 310-2, 310-3, and 310-4). Service 130 may determine, based on the direction of movement of vehicle 310, a portion of vehicle 310 that would be visible to the rider along the line of sight, and may determine the relative orientation of the vehicle to be an orientation of the vehicle that enables the portion of the vehicle to be visible to the rider at the line of sight (e.g., as depicted in user interfaces 350, and discussed above with reference to FIG. 3).

Based on the relative orientation obtained from determination 508, service 130 may generate for display 510, on a client device of the rider (e.g., on user interface 350 of a client device of rider 315), the model at an appropriate angle (e.g., the angle represented in user interface 350-1). The user may thereafter rotate the model manually to different angle. Alternatively, or additionally, the model may automatically rotate as rider 315 and/or vehicle 310 move (e.g., based on the line of sight discussion above), the object of the automatic rotation being to continually have the orientation of the car match a profile of the car that is visible to the rider 315.

When generating the model itself (irrespective of orienting it at a particular angle), as discussed above, service 130 may obtain information about the type of the vehicle (e.g., as indicated based on input from an operator of vehicle 110), and may retrieve a generic model corresponding to the type (e.g., from vehicle model database 132). Service 130 may receive, from a client device of the driver, one or more images or videos of the vehicle (e.g., as discussed above with respect to FIG. 1), and may identify a distinctive feature from the image and modify the generic model to include the distinctive feature. Interstitially, also discussed above, service 130 may store the distinctive feature and a vector mapping the distinctive feature to a portion of the generic image, to distinctive feature database 134.

Additional Safety Features

The systems and methods discussed above can be further leveraged into additional safety features for rider 315. For example, in rare coincidental scenarios, there may be multiple vehicles with similar distinctive features (or no distinctive features) in the vicinity of rider 315, and thus rider 315 may have difficulty resolving which one of those vehicles has an operator who accepted the task.

In such scenarios, service 130 may receive an image taken by a camera sensor of the client device of the rider (e.g., where rider 315 activates a camera sensor of his or her client device within the context of the ridesharing application and captures an image (or video) of a vehicle, and where the rider 315 requests verification that he or she is about to enter the right vehicle). Service 130 may then determine whether the image matches the model (e.g., by comparing the image (or a frame of the video) to the model. Service 130 may determine whether the image matches the model (e.g., by identifying a matching distinctive feature), and, in response to determining that the image matches the model, service 130 may cause the client device of the rider to output confirmation indicia (e.g., a message noting that this is the correct vehicle). In response to determining that the image does not match the model, service 130 may cause the client device of the rider to output denial indicia (e.g., a message noting that this is not the correct vehicle).

As yet another safety feature, in some environmental conditions it may be difficult for a rider to identify the vehicle. For example, a vehicle may look differently in daylight versus nighttime, or may look different under a street lamp or in snow, etc. In an embodiment, service 130 may determine indicia of an environmental condition. The term indicia of an environmental condition may refer to any information that reflects an environmental condition, such as indicia of whether it is day or night, whether it is cloudy, snowy, or rainy, indicia of whether a bright nightlight is shining at a vehicle, etc. Service 130 may determine this indicia by retrieving it from a known source (e.g., a weather or time source), or may determine it using sensors of vehicle 110 or other sensors in the vicinity of vehicle 110 (e.g., a camera or light sensor in vehicle 110 or located in the same city as vehicle 110 happens to be passing through). Service 130 may then modify the displayed model based on the environmental condition to show a better approximation of how the vehicle is likely to look in that environmental condition. Various environmental conditions may have known templates stored in a database (e.g., vehicle model database 132), and service 130 may modify the displayed model based on instructions in a template corresponding to the indicated environmental condition.

As yet another safety feature, service 130 may cause an application (e.g., the ridesharing application) to accept feedback from the rider that the vehicle does not match the model. In response to receiving such feedback, service 130 may command the application to prompt the rider to capture an image of a person operating the vehicle. Service 130 may receive the image of the person operating the vehicle, and may cause the client device of the rider (e.g., rider 115) to output indicia of whether the person driving the vehicle matches the driver who accepted the task. If the vehicle does not match the driver, service 130 may take further precautionary measures, such as de-activating the driver's subscription and/or prompting the driver to capture updated photos of his or her vehicle to reform a model. Service 130 may alert an administrator to scrutinize whether the driver has fraudulently represented the vehicle that he or she is operating.

Computing Hardware

Figure 6:
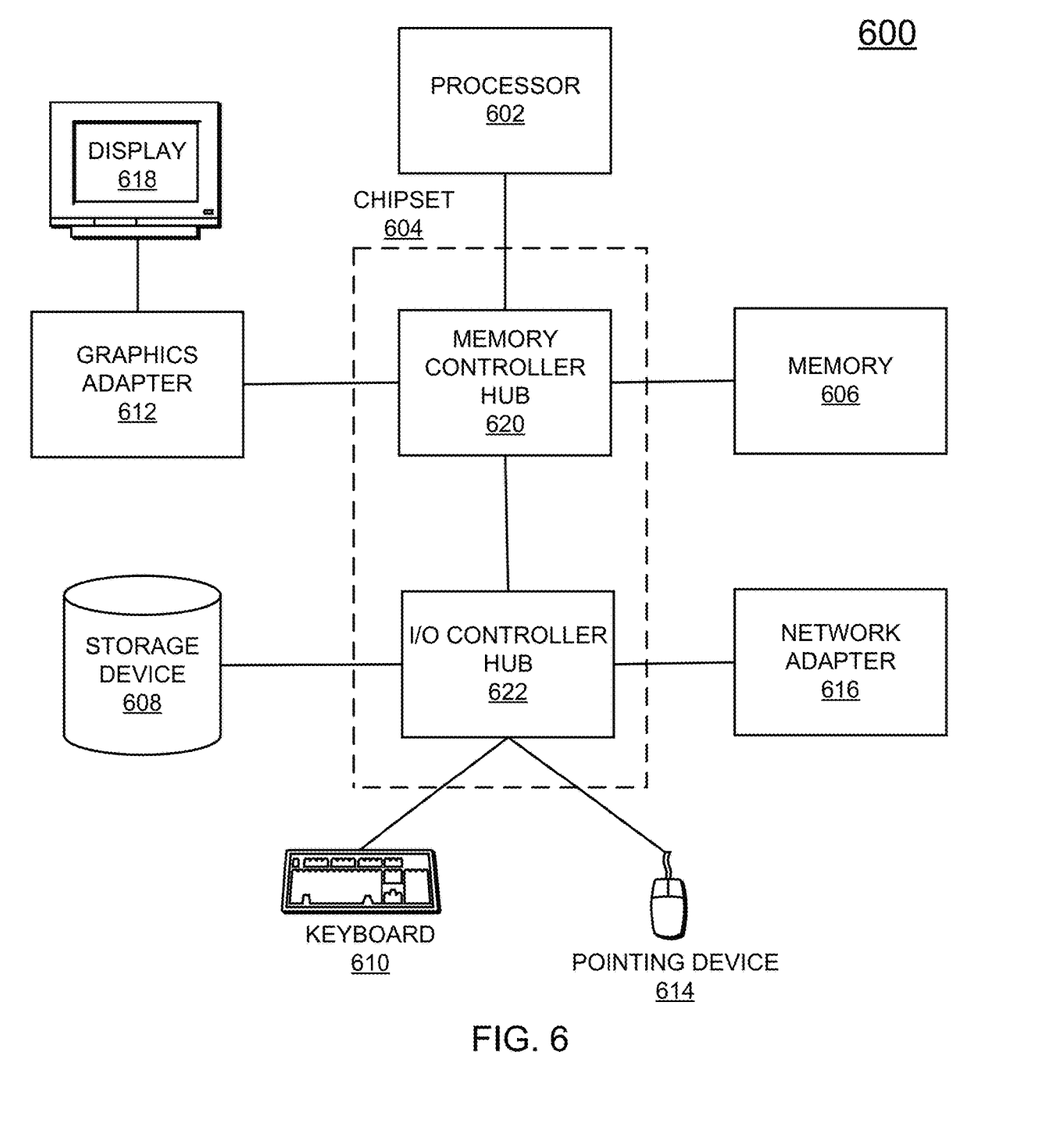
FIG. 6 is a block diagram that illustrates a computer system, according to one embodiment.

The entities shown in FIGS. 1-4 are implemented using one or more computers. FIG. 6 is a block diagram that illustrates a computer system 600 for acting, e.g., as a client device (of an operator of vehicle 110 or of rider 115, for example) or service 130, according to one embodiment.

Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612, and may be used, for example, to output user interface 350 and/or user interface 450. In one embodiment, the functionality of the chipset 604 is provided by a memory controller hub 620 and an I/O controller hub 622. In another embodiment, the memory 606 is coupled directly to the processor 602 instead of the chipset 604. A client device is often referred to herein as a mobile device, but can be any device capable of executing a ridesharing application and/or rendering and displaying the model.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 120.

As is known in the art, a computer 600 can have different and/or other components than those shown in FIG. 6. In addition, the computer 600 can lack certain illustrated components. For example, the computer acting as the location determination service 130 can be formed of multiple blade servers linked together into one or more distributed systems and lack components such as keyboards and displays. Moreover, the storage device 608 can be local and/or remote from the computer 600 (such as embodied within a storage area network (SAN)).

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for providing a model of a vehicle to a rider, the method comprising:
   determining that a driver has accepted a task to operate a vehicle from a first location to a rider location;
   accessing a model corresponding to the vehicle, wherein the model was generated by:
      receiving, from a client device of the driver, an image of the vehicle,
      identifying a distinctive feature from the image, and
      modifying a generic model corresponding to a type of the vehicle to include the distinctive feature;
   determining a direction of movement of the vehicle;

determining a relative orientation of the vehicle with respect to the rider based on the first location, the direction of movement of the vehicle, and the rider location; and generating for display, on a client device of the rider, the model at an angle determined based on the relative orientation.

2. The computer-implemented method of claim 1, wherein the model was generated further by:
receiving information about the type of the vehicle; and
retrieving the generic model corresponding to the type.

3. The computer-implemented method of claim 1, wherein determining the relative orientation comprises:
determining, based on the location of the rider and the first location, a line of sight between the rider and the vehicle;
determining, based on the direction of movement of the vehicle, a portion of the vehicle that would be visible to the rider along the line of sight; and
determining the relative orientation of the vehicle to be an orientation of the vehicle that enables the portion of the vehicle to be visible to the rider at the line of sight.

4. The computer-implemented method of claim 3, wherein generating for display the model at the angle determined based on the relative orientation comprises:
rotating the model to an angle where a visible portion of the model matches the portion of the vehicle; and
determining the angle to be the angle where the visible portion of the model matches the portion of the vehicle.

5. The computer-implemented method of claim 1, further comprising:
receiving an image taken by a camera sensor of the client device of the rider;
determining whether the image matches the model; and
in response to determining that the image matches the model, causing the client device of the rider to output confirmation indicia.

6. The computer-implemented method of claim 1, further comprising retrieving, from a database, indicia of an environmental condition, wherein generating for display the model at the angle determined based on the relative orientation comprises modifying the model based on the environmental condition.

7. The computer-implemented method of claim 1, further comprising:
receiving feedback from the rider that the vehicle does not match the model;
in response to receiving the feedback, prompting the rider to capture an image of a person operating the vehicle;
receiving the image of the person driving the vehicle; and
causing the client device of the rider to output indicia of whether the person driving the vehicle matches the driver who accepted the task.

8. The computer-implemented method of claim 1, further comprising:
generating for display the model to the driver; and
receiving input at the client device of the driver indicating that a seat of the vehicle is occupied, wherein generating for display, on the client device of the rider, the model at the angle determined based on the relative orientation comprises including indicia within the model that the seat is occupied.

9. A non-transitory computer-readable storage medium storing computer program instructions executable by a processor to perform operations for providing a model of a vehicle to a rider, the computer program instructions comprising instructions to:

determine that a driver has accepted a task to operate a vehicle from a first location to a rider location;
access a model corresponding to the vehicle, wherein the model was generated by:
receiving, from a client device of the driver, an image of the vehicle,
identifying a distinctive feature from the image, and
modifying a generic model corresponding to a type of the vehicle to include the distinctive feature;
determine a direction of movement of the vehicle;
determine a relative orientation of the vehicle with respect to the rider based on the first location, the direction of movement of the vehicle, and the rider location; and
generate for display, on a client device of the rider, the model at an angle determined based on the relative orientation.

10. The non-transitory computer-readable storage medium of claim 9, wherein the model was generated further by:
receiving information about the type of the vehicle; and
retrieving the generic model corresponding to the type.

11. The non-transitory computer-readable storage medium of claim 9, wherein the instructions to determine the relative orientation comprise instructions to:
determine, based on the location of the rider and the first location, a line of sight between the rider and the vehicle;
determine, based on the direction of movement of the vehicle, a portion of the vehicle that would be visible to the rider along the line of sight; and
determine the relative orientation of the vehicle to be an orientation of the vehicle that enables the portion of the vehicle to be visible to the rider at the line of sight.

12. The non-transitory computer-readable storage medium of claim 11, wherein the instructions to generate for display the model at the angle determined based on the relative orientation comprise instructions to:
rotate the model to an angle where a visible portion of the model matches the portion of the vehicle; and
determine the angle to be the angle where the visible portion of the model matches the portion of the vehicle.

13. The non-transitory computer-readable storage medium of claim 9, wherein the computer readable instructions further comprise instructions to:
receive an image taken by a camera sensor of the client device of the rider;
determine whether the image matches the model; and
in response to determining that the image matches the model, cause the client device of the rider to output confirmation indicia.

14. The non-transitory computer-readable storage medium of claim 9, wherein the computer readable instructions further comprise instructions to retrieve, from a database, indicia of an environmental condition, wherein the instructions to generate for display the model at the angle determined based on the relative orientation comprise instructions to modify the model based on the environmental condition.

15. The non-transitory computer-readable storage medium of claim 9, wherein the computer readable instructions further comprise instructions to:
receive feedback from the rider that the vehicle does not match the model;
in response to receiving the feedback, prompt the rider to capture an image of a person operating the vehicle;
receive the image of the person driving the vehicle; and cause the client device of the rider to output indicia of whether the person driving the vehicle matches the driver who accepted the task.

16. A system, comprising:
a processor for executing computer program instructions; and
a non-transitory computer-readable storage medium storing computer program instructions executable by the processor to perform operations for providing a model of a vehicle to a rider, the operations comprising:
determining that a driver has accepted a task to operate a vehicle from a first location to a rider location;
accessing a model corresponding to the vehicle, wherein the model was generated by:
receiving, from a client device of the driver, an image of the vehicle,
identifying a distinctive feature from the image, and
modifying a generic model corresponding to a type of the vehicle to include the distinctive feature;
determining a direction of movement of the vehicle;
determining a relative orientation of the vehicle with respect to the rider based on the first location, the direction of movement of the vehicle, and the rider location; and
generating for display, on a client device of the rider, the model at an angle determined based on the relative orientation.

17. The system of claim 16, wherein the model was generated further by:
receiving information about the type of the vehicle; and
retrieving the generic model corresponding to the type.

18. The system of claim 16, wherein determining the relative orientation comprises:
determining, based on the location of the rider and the first location, a line of sight between the rider and the vehicle;
determining, based on the direction of movement of the vehicle, a portion of the vehicle that would be visible to the rider along the line of sight; and
determining the relative orientation of the vehicle to be an orientation of the vehicle that enables the portion of the vehicle to be visible to the rider at the line of sight.

19. The system of claim 18, wherein generating for display the model at the angle determined based on the relative orientation comprises:
rotating the model to an angle where a visible portion of the model matches the portion of the vehicle; and
determining the angle to be the angle where the visible portion of the model matches the portion of the vehicle.

20. The system of claim 16, wherein the operations further comprise:
receiving an image taken by a camera sensor of the client device of the rider;
determining whether the image matches the model; and
in response to determining that the image matches the model, causing the client device of the rider to output confirmation indicia.

* * * * *